United States Patent
Wan et al.

(10) Patent No.: US 12,301,383 B2
(45) Date of Patent: *May 13, 2025

(54) SEPARATE PFCP SESSION MODEL FOR NETWORK ACCESS BY RESIDENTIAL GATEWAYS

(71) Applicant: Nokia Solutions and Networks Oy, Espoo (FI)

(72) Inventors: Kenneth Wan, Ottawa (CA); Killian De Smedt, Antwerp (BE); Sanjay Wadhwa, Sunnyvale, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 341 days.

This patent is subject to a terminal disclaimer.

(21) Appl. No.: 17/873,690

(22) Filed: Jul. 26, 2022

(65) Prior Publication Data
US 2024/0039763 A1    Feb. 1, 2024

(51) Int. Cl.
| | |
|---|---|
| *H04L 12/66* | (2006.01) |
| *H04L 45/02* | (2022.01) |
| *H04L 67/141* | (2022.01) |

(52) U.S. Cl.
CPC .............. *H04L 12/66* (2013.01); *H04L 45/02* (2013.01); *H04L 67/141* (2013.01)

(58) Field of Classification Search
CPC ......... H04L 12/66; H04L 45/02; H04L 45/24; H04L 67/141; H04L 12/2878; H04L 12/2858; H04L 49/35; H04L 49/351; H04W 76/10

See application file for complete search history.

(56) References Cited

U.S. PATENT DOCUMENTS

| | | |
|---|---|---|
| 11,675,946 B1 | 6/2023 | Waters |
| 2006/0274743 A1 | 12/2006 | Yegin et al. |
| 2017/0142032 A1 | 5/2017 | Heinonen et al. |
| 2019/0335002 A1 | 10/2019 | Bogineni et al. |
| 2020/0213156 A1 | 7/2020 | Cheng et al. |

(Continued)

FOREIGN PATENT DOCUMENTS

| | | |
|---|---|---|
| CN | 113852588 A | 12/2021 |
| EP | 3989673 A1 | 4/2022 |
| WO | 2020/072652 A1 | 4/2020 |

OTHER PUBLICATIONS

Broadband Forum, "TR-470 5G Wireless Wireline Convergence Architecture," 3GPP Draft. 3rd generation Partnership Project, p. 33, Aug. 4, 2020.
"LTE; 5G; Interface between the control Plane and the User Plane nodes (3GPP TS 29.244 version 15.9.0 Release 15)," vol. 3Gpp CT, No. V15.9.0, pp. 1-205, Jul. 31, 2020.
"TR-456 AGF Functional Requirements," 3GPP Draft, R3-204642, 3rd Generation Partnership Project, pp. 100, Aug. 3, 2020.

(Continued)

*Primary Examiner* — Mohamed A Kamara
(74) *Attorney, Agent, or Firm* — Harness, Dickey & Pierce, P.L.C.

(57) ABSTRACT

A network element includes at least one processor and at least one memory. The at least one memory stores instructions that, when executed by the at least one processor, cause the network element to: establish, via the aggregate gateway function, a separate packet forwarding control protocol session for each packet data unit (PDU) session between the residential gateway and the network; and facilitate, via the aggregate gateway function, network access by the residential gateway via each PDU session according to a corresponding, separate packet forwarding control protocol session.

20 Claims, 4 Drawing Sheets

(56) References Cited

U.S. PATENT DOCUMENTS

| | | |
|---|---|---|
| 2020/0336564 A1 | 10/2020 | Kholmyansky et al. |
| 2021/0076257 A1 | 3/2021 | Pocha et al. |
| 2021/0092585 A1 | 3/2021 | Jaju et al. |
| 2021/0127271 A1* | 4/2021 | Wu .................. H04W 12/0471 |
| 2021/0160759 A1* | 5/2021 | Muthusamy .......... H04W 24/08 |
| 2022/0038311 A1 | 2/2022 | Shen et al. |
| 2022/0061129 A1 | 2/2022 | Pani et al. |
| 2022/0095196 A1 | 3/2022 | Yang et al. |
| 2022/0353336 A1 | 11/2022 | Cañete Martinez et al. |
| 2023/0136134 A1 | 5/2023 | Uppili et al. |
| 2023/0139272 A1 | 5/2023 | Niu et al. |
| 2023/0156091 A1 | 5/2023 | Poscic et al. |
| 2023/0164881 A1* | 5/2023 | Velev ................... H04W 76/27 370/329 |

OTHER PUBLICATIONS

Extended European Search Report for European Application No. 23187906.5 mailed Dec. 11, 2023.
Extended European Search Report for European Application No. 23187912.3 mailed Dec. 11, 2023.
"Control and User Plane Separation for a disaggregated BNG" Broadband Forum, Jun. 2020, p. 1-102.
Broadband Forum, "TR-459 Control and User Plane Separation for a disaggregated BNG," 3GPP Draft, C4-203064, May 14, 2020.
Extended European Search Report for European Application No. 23202473.7 mailed Mar. 18, 2024.
Japanese Notice of Refusal Corresponding to Application No. 2023-191274, dated Nov. 15, 2024.

* cited by examiner

SEPARATE PFCP SESSION MODEL FOR NETWORK ACCESS BY RESIDENTIAL GATEWAYS

TECHNICAL FIELD

One or more example embodiments relate to methods, apparatuses, and/or non-transitory computer-readable storage mediums for providing network access to residential gateways.

BACKGROUND

Third Generation Partnership Project (3GPP) 5th generation (5G) technology is a next generation of radio systems and network architecture that can deliver extreme broadband and ultra-robust, low latency connectivity. 5G technology improves a variety of telecommunication services offered to the end users and helps to support massive broadband that delivers gigabytes of bandwidth per second on demand for both uplink and downlink transmissions.

In general, a 5G network may support IP services, such as IP television (IPTV) services for a residential gateway (RG), such as a Fixed Network-RG (FN-RG) served by a 5G Core (5GC).

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

At least one example embodiment provides a method for network access by a residential gateway (e.g., a fixed network residential gateway) via a network (e.g., a wireless core network) in a control and user plane separation (CUPS) architecture, the method comprising: establishing, via an aggregate gateway function, a separate packet forwarding control protocol session for each packet data unit (PDU) session between the residential gateway and the network; and facilitating, via the aggregate gateway function, network access by the residential gateway via each PDU session according to a corresponding, separate packet forwarding control protocol session.

At least one other example embodiment provides a non-transitory computer-readable medium including program instructions that, when executed by a network element, cause the network element to perform a method for network access by a residential gateway via a network in a control and user plane separation (CUPS) architecture, the method comprising: establishing, via an aggregate gateway function, a separate packet forwarding control protocol session for each packet data unit (PDU) session between the residential gateway and the network; and facilitating, via the aggregate gateway function, network access by the residential gateway via each PDU session according to a corresponding, separate packet forwarding control protocol session.

At least one other example embodiment provides a network element to facilitate network access by a residential gateway via a network in a control and user plane separation (CUPS) architecture, the control and user plane separation architecture including an aggregate gateway function having a control plane and a separate user plane. The network element includes at least one processor and at least one memory. The at least one memory stores instructions that, when executed by the at least one processor, cause the network element to: establish, via the aggregate gateway function, a separate packet forwarding control protocol session for each packet data unit (PDU) session between the residential gateway and the network; and facilitate, via the aggregate gateway function, network access by the residential gateway via each PDU session according to a corresponding, separate packet forwarding control protocol session.

At least one other example embodiment provides a network element to facilitate network access by a residential gateway via a network in a control and user plane separation (CUPS) architecture, the control and user plane separation architecture including an aggregate gateway function having a control plane and a separate user plane. The network element includes: means for establishing a separate packet forwarding control protocol session for each packet data unit (PDU) session between the residential gateway and the network; and means for facilitating network access by the residential gateway via each PDU session according to a corresponding, separate packet forwarding control protocol session.

According to one or more example embodiments, the aggregate gateway function may authenticate the residential gateway to the network in response to a control message from the residential gateway, and the aggregate gateway function may establish a first packet forwarding control protocol session for a first PDU session between the residential gateway and the network, in response to the residential gateway being authenticated to the network.

The aggregate gateway function may include an aggregate gateway function user plane and an aggregate gateway function control plane. Packet forwarding control protocol session establishment messages may be exchanged between the aggregate gateway function user plane and the aggregate gateway function control plane to establish a first packet forwarding control protocol session for a first PDU session between the residential gateway and the network.

The packet forwarding control protocol session establishment messages may include a packet forwarding control protocol session establishment request message and a packet forwarding control protocol session establishment response message.

The first PDU session may be established after establishing the first packet forwarding control protocol session, and/or IP addresses and prefixes may be obtained from the network for network access by the residential gateway via the first PDU session.

Each packet forwarding control protocol session may host, for a respective PDU session, a first set of forwarding rules for forwarding control messages between a control plane and a separate user plane and a second set of forwarding rules for forwarding data traffic between the control plane and the separate user plane.

For at least a first PDU session, a first packet forwarding control protocol session for hosting a first set of forwarding rules for forwarding control messages between a control plane and a separate user plane may be established. The first packet forwarding control protocol session may be modified to add a second set of forwarding rules for forwarding data traffic between the control plane and the separate user plane.

For at least a first PDU session, a first packet forwarding control protocol session for hosting a first set of forwarding rules for forwarding control messages between a control plane and a separate user plane and a second set of forwarding rules for forwarding data traffic between the control plane and the separate user plane may be established. For at least the first PDU session, the second set of forwarding rules may then be modified.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
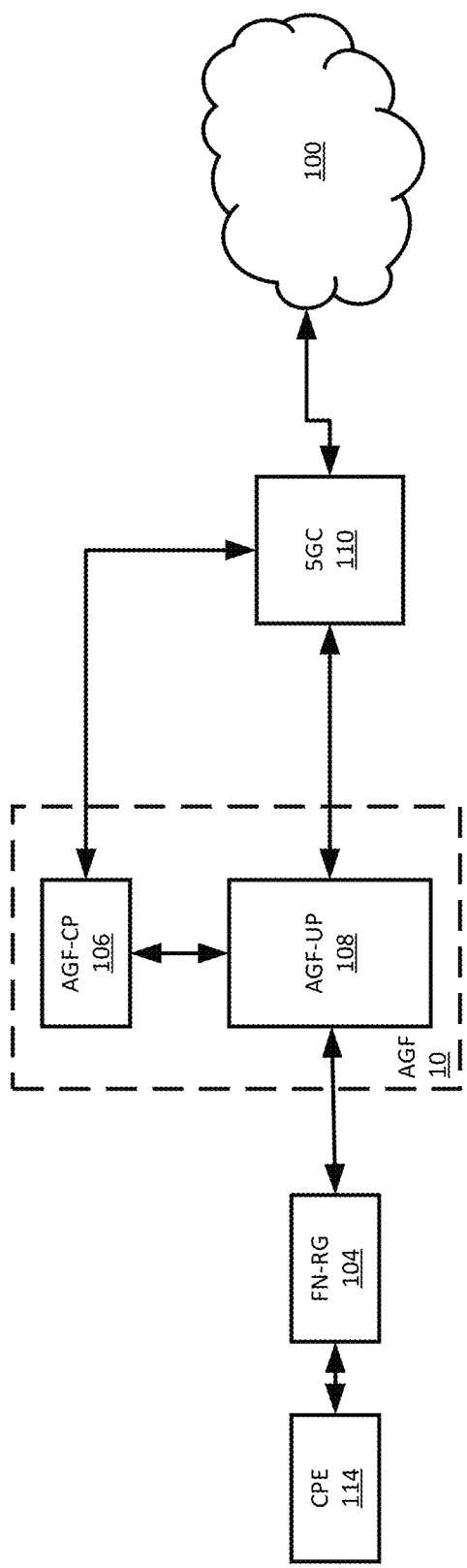
FIG. 1 is a block diagram illustrating a portion of a system architecture for wireless core network access, according to example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of a function or network element such as a network node, Aggregate Gateway Function (AGF), server, etc., it should be understood that one or more example embodiments discussed herein may be performed by one or more processors (or processing circuitry) at the applicable device, apparatus, network node, network element, or system. For example, according to one or more example embodiments, at least one memory may include or store computer program code, and the at least one memory and the computer program code may be configured to, with at least one processor, cause the network element to perform the operations discussed herein. In another example, at least one memory may store instructions that, when executed by the at least one processor, cause the network element to perform the operations discussed herein.

As discussed herein, the term "mechanism," in addition to its plain and ordinary meaning, may refer to methods, apparatuses and/or non-transitory computer readable storage mediums where applicable.

As discussed herein, the terminology "one or more" and "at least one" may be used interchangeably.

It will be appreciated that a number of example embodiments may be used in combination.

As discussed herein, the term "subscriber" refers to the purchaser or subscriber of broadband services, and which utilizes a residential gateway to access the services. The term "user" refers to users of customer premises equipment (CPE) that send and receive user traffic through the residential gateway. Although used in this way for the sake of clarity, a user may also be referred to as a subscriber.

As discussed herein, a packet data unit (PDU) session refers to an IP based PDU session. An IP based PDU session (sometimes referred to as an IP session) refers to an IP connection established between a residential gateway (e.g., a Fixed Network-Residential Gateway (FN-RG)) and a wireless core network, such as a 5GC, where the wireless core network assigns the residential gateway one or more IP addresses to use for transmission and reception of traffic (e.g., data and control traffic). In operation, a residential gateway utilizes the assigned IP address(es) or IP prefix(es) to connect to the internet (or other data network). In at least some instances, a residential gateway may obtain several different IP addresses/prefixes for each type of service, wherein each represents a different IP Session. IP based PDU sessions may include a single IPv4 session, a single IPv6 session or a single dual stack IP session. Although discussed herein with regard to IP sessions for example purposes, example embodiments should not be limited to these examples. Rather, example embodiments may be applicable to other PDU session types.

As discussed herein, Customer Premises Equipment (CPE) or CPE device is understood to be a hardware device or equipment typically located at the home or business of a customer. Example CPE devices may include terminals or electronic devices such as mobile phones, laptops, computers, tablets, WiFi access points, WiFi extenders, fixed wireless access units, Small Cell devices, or the like.

In a 5G architecture, the Packet Forwarding Control Protocol (PFCP) (also referred to as the PFCP protocol) is used to program traffic forwarding rules from the control plane or control plane function (e.g., Aggregate Gateway Function-Control Plane (AGF-CP)) to the user plane or user plane function (e.g., AGF-User Plane (AGF-UP)) and vice-versa. Each set of traffic forwarding rules that can be used for one or more PDU sessions from a single residential gateway is referred to as a PFCP session.

Generally, the control plane is responsible for maintaining session states and providing instructions to the user plane. The user plane is responsible for moving packets through the system from ingress to egress by following the traffic rules programmed by the control plane, and independently interacting with other nodes in the network through various routing protocols (e.g., Ethernet Virtual Private Network (EVPN), Border Gateway Protocol (BGP), Interior Gateway Protocol (IGP), etc.).

In the context of wireline access to the 5GC, residential gateways, such as FN-RGs, may be served by the 5GC.

FIG. 1 is a block diagram illustrating a portion of a system architecture for wireless core network access by a FN-RG, according to example embodiments. In the example shown in FIG. 1, the system architecture incorporates a control and user separation (CUPS) architecture.

Referring to FIG. 1, the architecture includes a FN-RG 104, an Aggregate Gateway Function (AGF) node 10, a wireless core network 110 and a Data Network (DN), such as the Internet 100. The AGF 10 includes an AGF-CP 106 and an AGF-UP 108. In this example, the wireless core network 110 is a 5GC. However, example embodiments should not be limit to the example embodiments discussed herein.

The FN-RG 104 is a residential gateway that connects one or more CPE 114 to the Internet (or other data network) 100 either through a conventional broadband network or through the 5GC 110. As is generally known, a FN-RG is unmodified for the sake of accessing the 5GC and utilizes a wireline access entity (W-AGF) (not shown) that terminates control signaling (e.g., 3GPP non-access stratum (NAS) signaling, including the NAS signaling carrying User Equipment Route Selection Policy (URSP) rules) on behalf of the unmodified FN-RGs. As discussed herein, the FN-RG 104 may sometimes be referred to as RG 104. The FN-RG 104 may be a Point-to-Point Protocol over Ethernet (PPPoE) type or Internet Protocol (IP) over Ethernet (IPoE) type.

Generally, in the context of 5G, the FN-RG 104 registers and authenticates with the 5GC 110, via the AGF 10, to gain access to the 5GC 110. Once authenticated with the 5GC 110, the FN-RG 104 may request one or more IP addresses. The FN-RG 104 may either utilize the assigned IP address (es) as the Network Address Translation (NAT) public address (e.g., for IPv4) or assign the prefixes directly to the end user equipment (e.g., for IPv6). The FN-RG 104 may process and send conventional broadband Quality of Service (QoS) parameters, but rely on the AGF 10 to translate between standard broadband QoS parameters and 5G QoS parameters. The FN-RG 104 may connect to the AGF 10 via any wireline technology (e.g., Digital Subscriber Line (DSL), Passive Optical Network (PON), Cable, etc.).

The FN-RG 104 may support multiple services, such as IPTV. In some embodiments, IPTV can be defined as multimedia services, such as television, video, audio, textual media, graphics, data, combinations thereof, and/or the like that are delivered over IP-based networks supporting the required level of QoS, Quality of Experience (QoE), security, interactivity, reliability, or the like.

The FN-RG 104 is connected to the 5GC 110 via the AGF 10, which serves as a gateway (or gateway function). The AGF 10 is a function added to a wireline access network (e.g., a Wireline 5G Access Network (W-5GAN)) that enables and/or allows connectivity to the 5GC 110 via wireline networks.

Still referring to FIG. 1, the AGF 10 is disaggregated to separate the control plane (AGF-CP 106) and the user plane (AGF-UP 108). This architecture is referred to as control and user plane separation (CUPS). CUPS enables flexible network deployment and operation through distributed or centralized deployment and independent scaling between control plane and user plane functions, without affecting the functionality of the existing nodes subject to the split.

In addition to the functionality discussed herein, the AGF-CP 106 handles control plane signaling for both 5G control messages, packets or signaling and wireline control messages, packets or signaling to and from the FN-RG 104. For example, the AGF-CP 106 programs the AGF-UP 108 with forwarding rules via the PFCP such that control and signaling packets from the FN-RG 104 are redirected from the AGF-UP 108 to the AGF-CP 106 via the control packet redirect interface (CPR interface). The AGF-CP 106 communicates with the 5GC 110 via the N2 interface.

The 5GC 110 provides network access for the FN-RG 104 via a PDU session, and informs the AGF-CP 106 about the General Packet Radio Service (GPRS) Tunneling Protocol-tunnel endpoint ID (GTP-TEID) that the FN-RG 104 is to use to connect to (send and receive packets to and from) the 5GC 110 for the PDU session. The AGF-CP 106 programs the forwarding rules at the AGF-UP 108 via the state control interface (SCi) utilizing the PFCP protocol to provide a data path for the FN-RG 104 to and from the 5GC 110. Instructions on data forwarding per PDU session are based on instructions received from the AGF-CP 106 through the SCi utilizing the PFCP protocol.

The 5GC 110 is a subscriber management infrastructure that provides access to the Internet (or other data network) 100 on a per subscriber basis. The 5GC 110 is specified by the 3GPP. The AGF-CP 106 connects to the Access Mobility and Management Function (AMF) (not shown) in the 5GC 110 and the AGF-UP 108 connects to the User Plane Function (UPF) (not shown) in the 5GC 110.

Figure 2:
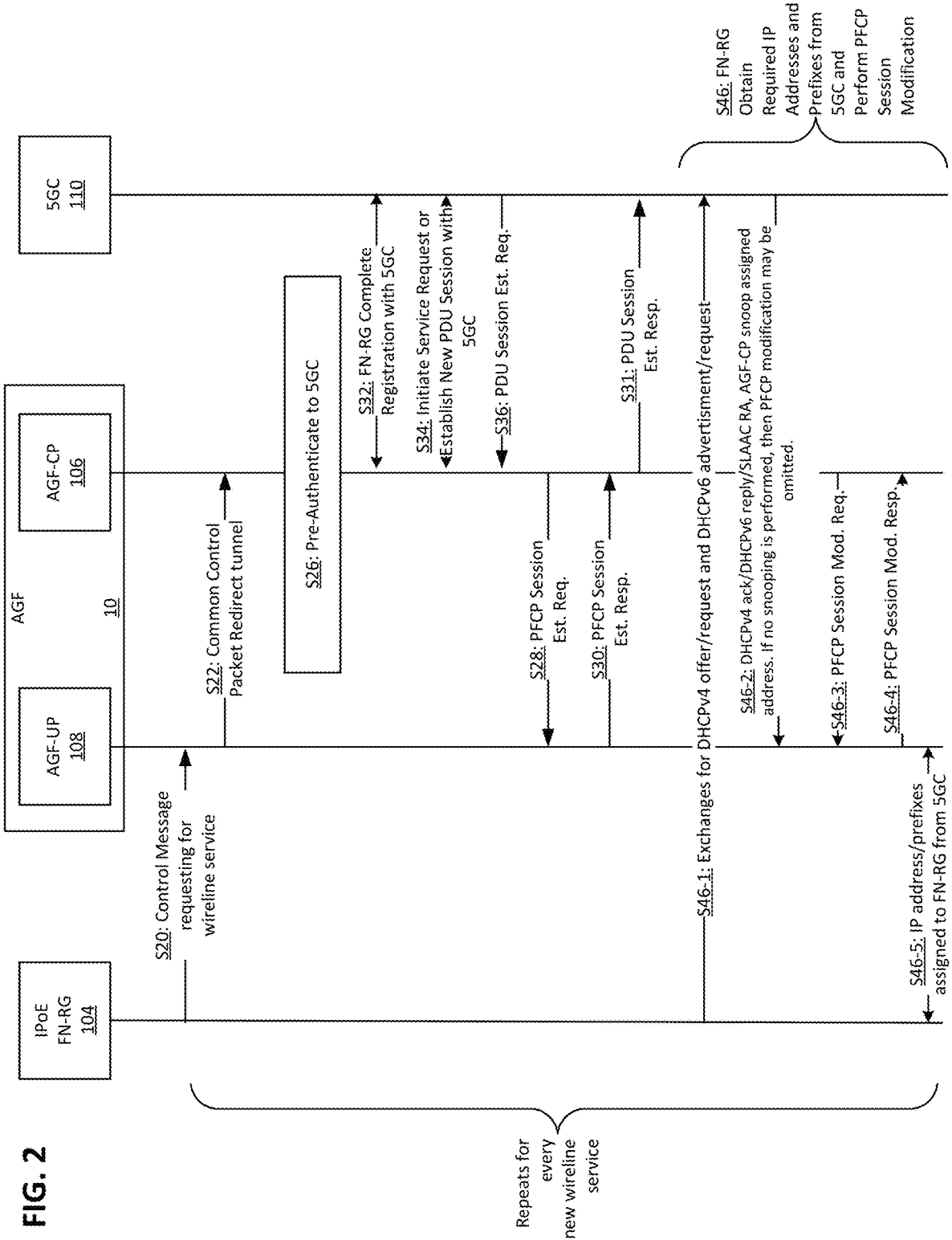
FIG. 2 is a signal flow diagram illustrating a method according to example embodiments.

FIG. 2 is a signal flow diagram illustrating an example embodiment of a method for wireless core network access by an IPoE FN-RG in a CUPS architecture.

For example purposes, the method shown in FIG. 2 will be discussed with regard to the architecture shown in FIG. 1 and with regard to an IP based PDU session (referred to more simply herein as a PDU session). However, example embodiments should not be limited to this example.

Also for example purposes, FIG. 2 will be discussed with regard to an example embodiment including a pre-authentication process. As discussed later, however, example embodiments should also not be limited to this example. Rather, the pre-authentication may be optional in, for example, instances where a policy fetch or local policy configuration is used.

As discussed in more detail below, for the IPoE type FN-RG 104, the Dynamic Host Configuration Protocolv4 (DHCPv4), DHCPv6, or Stateless Address Autoconfiguration (SLAAC) request triggers the AGF-CP 106 to initiate registration to the 5GC 110. Once having received a PDU session request from the 5GC 110, the AGF-CP 106 establishes a PFCP session (e.g., single PFCP session) for IPoE control messages (e.g., DHCP, DHCPv6, SLAAC) and also the requested PDU session forwarding, such that a same (e.g., single) PFCP session is used for both control and data packet forwarding for the PDU session for the requested wireline service.

Referring to FIG. 2, at S20 the AGF-UP 108 receives, from the FN-RG 104, a control message requesting wireline service (e.g., request for an IP connection or PDU session) to access the Internet (or other data network) 100 through the 5GC 110. In this example, the control message is sent via IPoE (e.g., as a DHCPv4 discover, DHCPv6 solicit, Stateless Address Autoconfiguration (SLAAC) solicit, etc.).

Upon receipt, at S22 the AGF-UP 108 forwards the control message to the AGF-CP 106 via a common control packet redirect tunnel between the AGF-UP 108 and the AGF-CP 106.

At S26, the AGF-CP 106 pre-authenticates the FN-RG 104 to the 5GC 110. The pre-authentication with policy enforcements may be performed via an authentication, authorization and accounting (AAA) server, via a policy server or locally. In a more specific example, using the RADIUS protocol and RADIUS servers, the AGF 10 (e.g., via the AGF-CP 106) provides the authentication/policy server (not shown) in the 5GC 110 with authentication information for the FN-RG 104 (the requesting residential gateway). The authentication information may include the logical port/system on which the control message was received, the name of the subscriber, the location of the logon of the FN-RG 104 and other information obtained from, or based on, the control message from the FN-RG 104. The authentication/policy server may determine whether the request from the FN-RG 104 should be accepted or rejected (e.g., based on whether a hostname matching the FN-RG 104 exists at the authentication/policy server) and sends a response message indicating the same to the AGF-CP 106.

If the AGF 10 receives a response message indicating that the request from the FN-RG 104 should be rejected, then the AGF 10 (e.g., via the AGF-CP 106) rejects the request from the FN-RG 104 for access to the 5GC 110, indicates the same to the FN-RG 104, and the process terminates. In one example, if rejected, the response message from the authentication/policy server may indicate that the FN-RG 104 should continue with normal broadband authentication, rather than be authenticated to the 5GC 110.

Other than initially requesting wireline service, in another example, the control message from the FN-RG 104 may request a second IP service, where the subscription for the FN-RG 104 allows only a single IP service. In this case, the AGF 10 may reject the request from the FN-RG 104 for access to the 5GC 110. In yet another example, the control message may request a service not provided by the 5GC 110. In this case, the AGF 10 may also reject the request.

Still referring to S26 in FIG. 2, if the FN-RG 104 request is accepted, then the authentication/policy server sends a response message indicating the same and may also return a list of attributes associated with the subscription for the FN-RG 104. These attributes may include filter rules, Quality of Service (QoS) levels (e.g., whether the user traffic from the FN-RG 104 should be treated to premium QoS), limitations on numbers of PDU sessions for the FN-RG 104 (e.g., whether the subscriber should be limited to a single IP session), whether to process an IPTV request, etc.

After completing pre-authentication, at S32 the AGF-CP 106 completes registration of the FN-RG 104 with the 5GC 110. Because the completing of registration by the AGF-CP 106 on behalf of the FN-RG 104 is generally known, a detailed discussion is omitted.

At S34, the AGF-CP 106, on behalf of the FN-RG 104, initiates a service request or establishing of a new PDU session with the 5GC 110. As is generally known, a service request may be used in the case where the FN-RG 104 needs and/or wants to re-establish a PDU session. In this case, the FN-RG 104 is still registered with the 5GC 110, but may have temporarily lost connection with the AGF 10 (e.g., when a line is cut). If, however, the control message is requesting initial network access by the FN-RG 104 to the 5GC 110, then at S34 the AGF-CP 106 may initiate establishing of a new (initial) PDU session with the 5GC 110. Because service request and PDU session establishment methods such as this are generally known, a detailed discussion is omitted. The AGF-CP 106 then awaits receipt of a PDU session establishment request message (PDU Session Est. Req.) from the 5GC 110.

At S36, the AGF 10 (e.g., via the AGF-CP 106) receives the PDU session establishment request (PDU Session Est. Req.) message from the 5GC 110. The 5GC 110 may generate and send the PDU session establishment request message to the AGF 10 in response to, or based on, the initiation of the service request or PDU session from the AGF-CP 106 at S34. Because PDU session establishment request messages are generally known, a detailed discussion is omitted.

Upon receiving, or in response to, the PDU session establishment request message from the 5GC 110, at S28 and S30 the AGF 10 establishes a PFCP session (e.g., a single PFCP session) for IPoE control messages (e.g., DHCPv4, DHCPv6, SLAAC, etc.) and data traffic for the PDU session. Accordingly, the PFCP session includes a set of forwarding rules for forwarding the IPoE control messages between the AGF-UP 108 and the AGF-CP 106, and a set of forwarding rules for forwarding data traffic for the PDU session between the AGF-CP 106 and the AGF-UP 108.

In more detail, for example, once having received a PDU session establishment request message at the AGF-CP 106, at S28 the AGF-CP 106 outputs a PFCP session establishment request message (PFCP Session Est. Req.) to the AGF-UP 108. Based on the PFCP session establishment request message, the AGF-UP 108 establishes the PFCP session at the AGF-UP 108. At S30, the AGF-UP 108 then outputs a PFCP session establishment response message (PFCP Session Est. Resp.) to the AGF-CP 106, indicating that the PFCP session has been established at the AGF-UP 108. Because PFCP session establishment messages and methods for establishing a PFCP session are generally known, further detailed discussion is omitted.

After having received the PFCP session establishment response message at the AGF-CP 106, at S31 the AGF 10 (e.g., via the AGF-CP 106) sends a PDU session establishment response message (PDU Session Est. Resp.) to the 5GC 110 indicating that the PFCP session for the PDU session has been established. Because PDU session establishment response messages are generally known, a detailed discussion is omitted.

At S46, the FN-RG 104 obtains the requisite IP address (es) and prefix(es) for the PDU session from the 5GC 110 and performs any necessary PFCP session modification. According to example embodiments, the FN-RG 104 may utilize the assigned one or more IP addresses as the NAT public address (e.g., for IPv4) or assign the prefixes directly to the end user equipment (e.g., for IPv6).

According to at least one example embodiment, S46 may include S46-1, S46-2, S46-3, S46-4 and S46-5, which will be discussed in more detail below. However, example embodiments should not be limited this example.

At S46-1, the FN-RG 104 and the 5GC 110 exchange DHCPv4 offer/request (and/or DHCPv6 advertisement/request) messages. Because these messages are generally known, a detailed discussion is omitted.

At S46-2, the 5GC 110 sends a DHCPv4 ack (and/or a DHCPv6 reply) message to the AGF-UP 108 (e.g., via the AGF-CP 106). In another example, the 5GC 110 may send a SLAAC RA message to the AGF-UP 108. In contrast to the conventional art, the message(s) at S46-2 is/are sent to the AGF-UP 108, rather than the FN-RG 104. Because the messages discussed with regard to S46-2 are generally known, a detailed discussion is omitted.

Also at S46-2, the AGF-CP 106 performs snooping of the assigned IP address to learn the IP address from the received DHCP message.

After the AGF-CP 106 snoops the assigned IP address, at S46-3 and S46-4, the AGF 10 modifies the PFCP session established at step S28 and S30 to modify and/or update the set of data forwarding rules for the established PDU session accordingly. In more detail, once having modified the PFCP session as needed at the AGF-CP 106, at S46-3 the AGF-CP 106 sends a PFCP session modification request message (PFCP Session Mod. Req.) to the AGF-UP 108. In one example, modification of the PFCP session by the AGF 10 includes updating traffic rules with the learnt FN-RG IP address and/or prefix along with the known FN-RG MAC address and VLAN tags. This updated traffic rule will ensure the AGF-UP 108 will forward traffic from a known FN-RG with the exact IP address and/or prefix, VLAN tags, and MAC address. Based on the PFCP modification request message, the AGF-UP 108 modifies the PFCP session as needed.

At 46-4, the AGF-UP 108 then sends a PFCP session modification response message (PFCP Session Mod. Resp.) to the AGF-CP 106, indicating that the PFCP session has been modified at the AGF-UP 108. Because PFCP modification messages and methods for modifying PFCP sessions are generally known, further detailed discussion is omitted.

At S46-5, the AGF-UP 108 forwards the control message that assigns the IP address/prefixes from the 5GC 110 to the FN-RG 104 in any known manner.

Although FIG. 2 is discussed with regard to snooping at S46-2, example embodiments should not be limited to this example. In another example embodiment, snooping may not be needed or performed at S46-2, in which case the PFCP modification at S46-3 and S46-4 may be omitted, and the IP address/prefixes may be assigned at S46-5 after or upon receipt of the DHCPv4 ack/DHCPv6 reply/SLAAC RA message at S46-2.

According to one or more example embodiments, once the PDU session between the FN-RG 104 and the 5GC 110 has been established (including the associated PFCP session), the AGF 10 facilitates access to the 5GC 110 by the FN-RG 104 according to the PFCP session including sets of forwarding rules for the control messages and data traffic for the requested PDU session.

According to one or more example embodiments, the signal flow shown in FIG. 2 may be performed for each wireline service request from the FN-RG 104 to the 5GC 110. Consequently, a separate PFCP session (e.g., single separate PFCP session) may include sets of forwarding rules for control messages and forwarding rules for data traffic for each wireline service between the FN-RG 104 and the 5GC 110.

Figure 3:
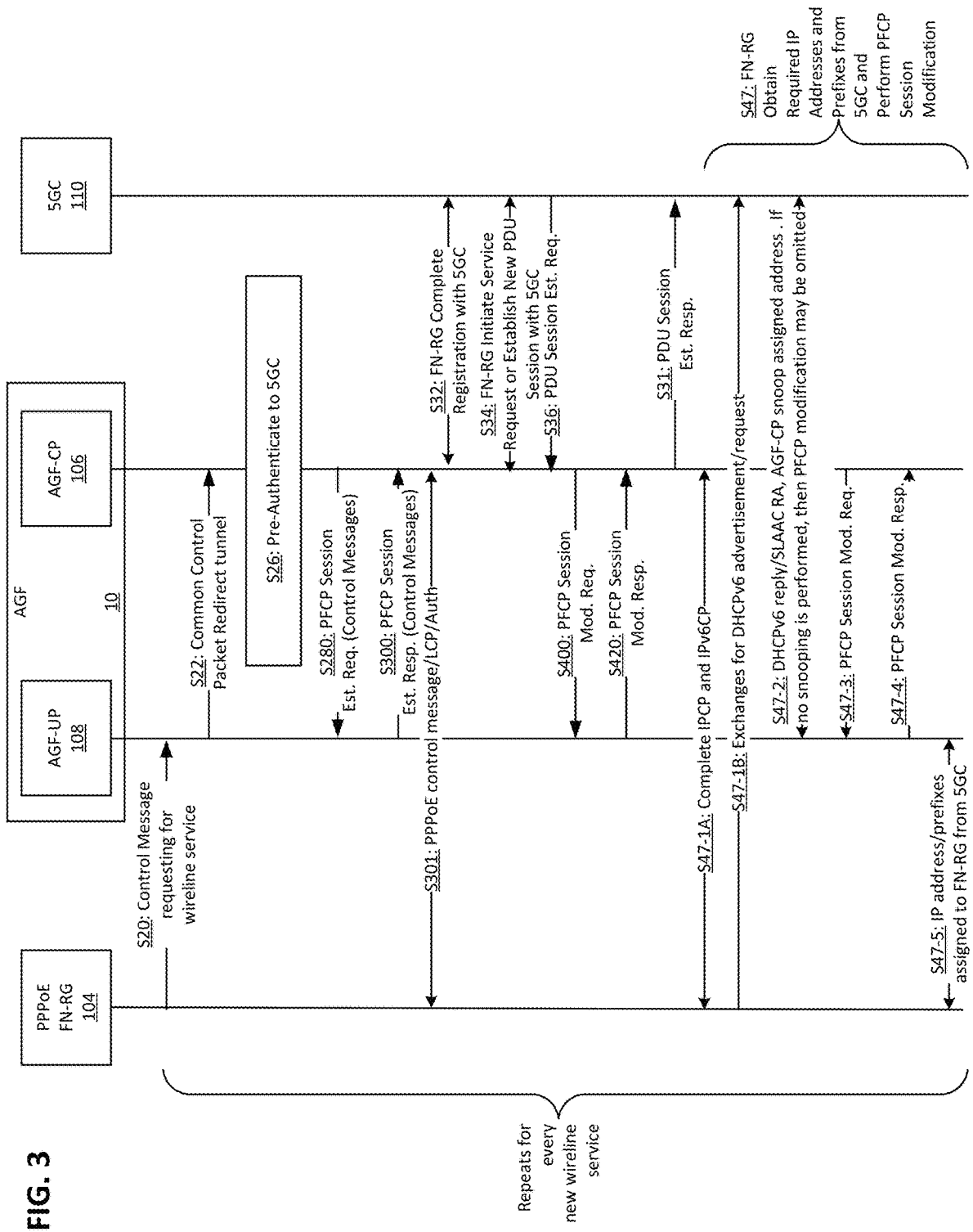
FIG. 3 is a signal flow diagram illustrating another method according to example embodiments.

FIG. 3 is a signal flow diagram illustrating an example embodiment of a method for wireless core network access by a PPPoE FN-RG in a CUPS architecture.

As with FIG. 2, for example purposes, the method shown in FIG. 3 will be discussed with regard to the architecture shown in FIG. 1 and with regard to an IP based PDU session. However, example embodiments should not be limited to this example.

Also for example purposes, FIG. 3 will be discussed with regard to an example embodiment including a pre-authentication process. As discussed above, however, example embodiments should not be limited to this example. Rather, the pre-authentication may be optional in, for example, instances where a policy fetch or local policy configuration is used.

As discussed in more detail below, for the PPPoE type FN-RG 104, a PPP message causes the AGF-CP 106 to establish a PFCP session to allow PPP control message exchange between the FN-RG 104 and the AGF-CP 106 via the AGF-UP 108. In this case, once having received a PDU session request from the 5GC 110, the AGF-CP 106 may modify the established PFCP session to include forwarding rules for data traffic for the requested PDU session, such that the same (e.g., single) PFCP session is used for both control and data packet forwarding for the PDU session.

Referring to FIG. 3, at S20 the AGF-UP 108 receives, from the FN-RG 104, a control message requesting wireline service to the Internet 100 through the 5GC 110. In this example, the control message is a PPPoE control message, such as a PPPoE Active Discovery Initiation (*PADI*) message, or other upstream control packet. As is generally known, a *PADI* message is a broadcast packet used by a client (e.g., FN-RG 104) to search for an active server (Access Concentrator) providing access to a desired service.

Upon receipt, at S22 the AGF-UP 108 forwards the control message to the AGF-CP 106 via the common control packet redirect tunnel between the AGF-UP 108 and the AGF-CP 106.

At S26, the AGF-CP 106 pre-authenticates the FN-RG 104 to the 5GC 110. The pre-authentication, conditions and/or results thereof may be the same or substantially the same as S26 discussed above with regard to the example embodiment shown in FIG. 2. Accordingly, a detailed discussion is not repeated here.

After completing pre-authentication, at S280 and S300 the AGF 10 establishes a PFCP session for PPPoE control messages for the PDU session. Accordingly, the PFCP session includes a set of forwarding rules for forwarding the PPPoE control messages between the AGF-UP 108 and the AGF-CP 106.

In more detail, for example, once the AGF-CP 106 receives a *PADI* message from the FN-RG 104, at S280 the AGF-CP 106 outputs a PFCP session establishment request message (PFCP Session Est. Req.) to the AGF-UP 108. Based on the PFCP session establishment request message, the AGF-UP 108 establishes the PFCP session at the AGF-UP 108. At S300, the AGF-UP 108 then outputs a PFCP session establishment response message (PFCP Session Est. Resp.) to the AGF-CP 106, indicating that the PFCP session has been established at the AGF-UP 108. Because PFCP session establishment messages and methods for establishing a PFCP session are generally known, further detailed discussion is omitted.

After the PFCP session establishment message exchange at S280/S300, at S301 the FN-RG 104 and the AGF-CP 106 exchange PPP Control, Link Control Protocol (LCP) and Auth messages, which may include Password Authentication Protocol (PAP)/Challenge Handshake Authentication Protocol (CHAP). Because this message exchange is generally known, a detailed discussion is omitted.

After the authentication message exchange between the AGF-CP 106 and FN-RG 104, at S32 the AGF-CP 106, on behalf of the FN-RG 104, completes registration of the FN-RG 104 with the 5GC 110 in the same or substantially the same manner as discussed above with regard to FIG. 2.

At S34, the AGF-CP 106, on behalf of the FN-RG 104, initiates a service request or establishing of a new PDU session with the 5GC 110 in the same or substantially the same manner as discussed above with regard to S34 in FIG. 2. The AGF-CP 106 then awaits receipt of a PDU session establishment request message (PDU Session Est. Req.) from the 5GC 110.

At S36, in the same or substantially the same manner as discussed above with regard to FIG. 2, the AGF 10 (e.g., via the AGF-CP 106) receives a PDU session establishment request message from the 5GC 110.

Upon receipt of, or in response to, the PDU session establishment request from the 5GC 110, at S400 and S420, the AGF 10 modifies the established PFCP session (established at S280/S300) to add a set of data forwarding rules for the requested PDU session, such that the modified PFCP session (e.g., single modified PFCP session) hosts a set of forwarding rules for forwarding control messages between the AGF-CP 106 and the AGF-UP 108 and a set of forwarding rules for forwarding data traffic for the PDU session between the AGF-CP 106 and the AGF-UP 108.

For example, the AGF-CP 106 and the AGF-UP 108 exchange PFCP session modification messages for the requested PDU session to add a set of forwarding rules for the data traffic for the requested PDU session. In more detail, once having modified the PFCP session as needed to add the necessary set of forwarding rules at the AGF-CP 106, at S400 the AGF-CP 106 sends a PFCP session modification request message (PFCP Session Mod. Req.) to the AGF-UP 108. Based on the PFCP session modification request message, the AGF-UP 108 modifies the PFCP session as needed to add the necessary set of forwarding rules at the AGF-UP 108. At S420, the AGF-UP 108 then sends a PFCP session modification response message (PFCP Session Mod. Resp.) to the AGF-CP 106, indicating that the PFCP session has been modified at the AGF-UP 108. Because PFCP modification messages and methods for modifying PFCP sessions are generally known, further detailed discussion is omitted.

At S31, the AGF 10 (e.g., via the AGF-CP 106) sends a PDU session establishment response message (PDU Session Est. Resp.) to the 5GC 110, in the same or substantially the same manner as in FIG. 2, to indicate that the PFCP session has been modified for the requested PDU session.

At S47, the FN-RG 104 then obtains the requisite IP address(es) and prefix(es) for the PDU session from the 5GC 110 and performs any further PFCP session modification that is needed. According to example embodiments, the FN-RG 104 may utilize the assigned one or more IP addresses as the NAT public address (e.g., for IPv4) or assign the prefixes directly to the end user equipment (e.g., for IPv6).

According to at least one example embodiment, S47 may include steps S47-1A, S47-1B, S47-2, S47-3, S47-4 and S47-5, which will be discussed in more detail below. However, example embodiments should not be limited to this example.

At S47-1A, the FN-RG 104 and the AGF-CP 106 complete the IP Control Protocol (IPCP) and IPv6CP exchange to establish IP over the point-to-point link between the FN-RG 104 and the AGF-CP 106. Because this exchange is generally known, a detailed discussion is omitted.

At S47-1B, the FN-RG 104 and the 5GC 110 exchange DHCPv6 advertisement/request messages. Because these messages are also generally known, a detailed discussion is omitted.

At S47-2, the 5GC 110 sends a DHCPv6 reply or SLAAC RA message to the AGF-UP 108 (e.g., via the AGF-CP 106). As with the example embodiment shown in FIG. 2, in contrast to the conventional art, the messages at S47-2 are sent to the AGF-UP 108, rather than the FN-RG 104. Because the messages discussed with regard to S47-2 are generally known, a detailed discussion is omitted.

Also at S47-2, the AGF-CP 106 snoops the assigned IP address in the same or substantially the same manner as discussed above with regard to S46-2 in FIG. 2.

After the AGF-CP 106 snoops the assigned IP address, at S47-3 and S47-4, the AGF 10 further modifies the PFCP session established at step S280 and S300 (and modified at S400 and S420) accordingly. In more detail, once having modified the PFCP session as needed at the AGF-CP 106, at S47-3 the AGF-CP 106 sends a PFCP session modification request message (PFCP Session Mod. Req.) to the AGF-UP 108. The modification of the PFCP session by the AGF 10 includes updating traffic rules with the learnt FN-RG IPv6 address and/or prefix along with the known FN-RG MAC address and VLAN tags. These updated traffic rules will ensure the AGF-UP 108 forwards traffic from a known FN-RG with the exact IPv6 address and/or prefix, VLAN tags, and MAC address. Based on the PFCP modification request message, the AGF-UP 108 modifies the PFCP session as needed. At S47-4, the AGF-UP 108 then sends a PFCP session modification response message (PFCP Session Mod. Resp.) to the AGF-CP 106, indicating that the PFCP session has been modified at the AGF-UP 108. Because PFCP session modification messages and methods for modifying PFCP sessions are generally known, further detailed discussion is omitted.

At S47-5, the AGF-UP 108 assigns the IP address/prefixes from the 5GC 110 to the FN-RG 104 in any known manner.

Although FIG. 3 is discussed with regard to snooping at S47-2, example embodiments should not be limited to this example. In another example embodiment, snooping may not be needed at S47-2, in which case the PFCP modification at S47-3 and S47-4 may be omitted, and the IP address/prefixes may be assigned at S47-5 after or upon receipt of the DHCPv6 reply or SLAAC RA message at S47-2.

According to one or more example embodiments, once the PDU session between the FN-RG 104 and the 5GC 110 has been established, the AGF 10 facilitates access to the 5GC 110 by the FN-RG 104 according to the PFCP session including sets of forwarding rules for the control messages and data traffic for the requested PDU session.

According to one or more example embodiments, the signal flow shown in FIG. 3 may be performed for each wireline service request from the FN-RG 104. Consequently, a separate PFCP session (e.g., single separate PFCP session) may include sets of forwarding rules for control messages and data traffic for each wireline service between the FN-RG 104 and the 5GC 110.

The example embodiments shown in FIGS. 2 and 3 are discussed with regard to a pre-authentication process performed at S26 (e.g., using the RADIUS protocol). However, example embodiments should not be limited to this example.

In another example, the DIAMETER protocol may be used. In this case, the AGF 10 may send, to a policy server, a policy request to fetch policy information indicating, among other things, whether the FN-RG 104 should utilize the 5GC or continue with normal broadband authentication. In this case, pre-authentication may be optional. If pre-authentication is omitted, the AGF 10 may determine whether the FN-RG 104 should utilize the 5GC or continue with normal broadband authentication based on the fetched policy information.

In another example, a local policy at the AGF 10 may be configured (e.g., by an operator) to indicate whether the FN-RG 104 should utilize the 5GC or continue with normal broadband authentication. In this case, pre-authentication may also be optional (e.g., using a local database). If pre-authentication is omitted, then the AGF 10 may determine whether the FN-RG 104 should utilize the 5GC or continue with normal broadband authentication based on the configured local policy.

Figure 4:
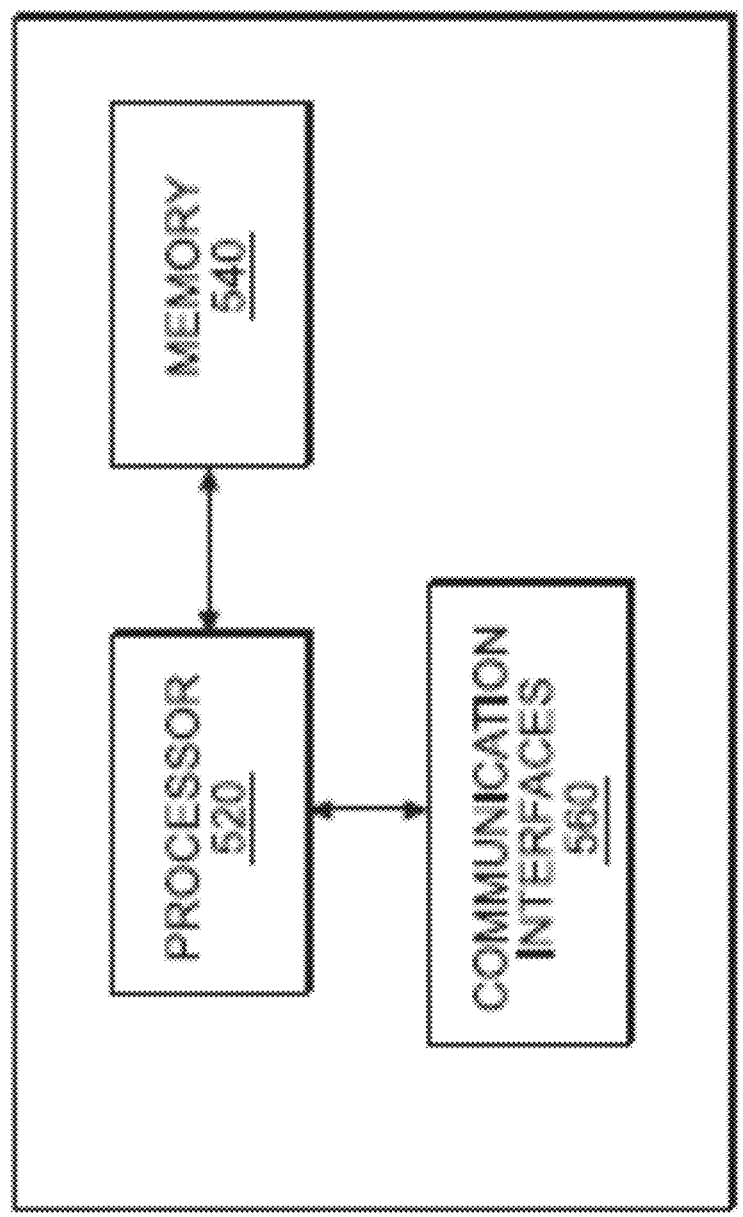
FIG. 4 illustrates an example embodiment of a network node at which an Aggregate Gateway Function (AGF), or other network element, may be implemented.

FIG. 4 illustrates an example embodiment of a network node at which an AGF may be implemented. The structure shown in FIG. 4 may also be representative of other network elements, such as residential gateways, CPEs, etc.

As shown, the network node includes: a memory 540; a processor 520 connected to the memory 540; various communication interfaces 560 connected to the processor 520. The various interfaces 560 may constitute a transceiver for transmitting/receiving data from/to other network elements (e.g., network nodes, routers, nodes, servers, BNGs, etc.). As will be appreciated, depending on the implementation of the network node, the network node may include many more components than those shown in FIG. 4. However, it is not necessary that all of these generally conventional components be shown in order to disclose the illustrative example embodiment. For example purposes, the example embodiment shown in FIG. 4 will be discussed with regard to a processor 520. However, it should be understood that the network node shown in FIG. 4 may include one or more processors or other processing circuitry, such as one or more Application Specific Integrated Circuits (ASICs).

The memory 540 may be a computer readable storage medium that generally includes a random access memory (RAM), read only memory (ROM), and/or a permanent mass storage device, such as a disk drive. The memory 540 also stores an operating system and any other routines/modules/applications for providing the functionalities of the network node (including UPF, CPF, MPF, etc.) to be executed by the processor 520. These software components may also be loaded from a separate computer readable storage medium into the memory 540 using a drive mechanism (not shown). Such separate computer readable storage medium may include a disc, tape, DVD/CD-ROM drive, memory card, or other like computer readable storage medium (not shown). In some example embodiments, software components may be loaded into the memory 540 via one of the various interfaces 560, rather than via a computer readable storage medium.

The processor 520 or other processing circuitry may be configured to carry out instructions of a computer program by performing the arithmetical, logical, and input/output operations of the system. Instructions may be provided to the processor 520 by the memory 540.

The various communication interfaces 560 may be wired and may include components that interface the processor 520 with the other input/output components. As will be understood, the various interfaces 560 and programs stored in the memory 540 to set forth the special purpose functionalities of the network node will vary depending on the implementation of the network node.

The interfaces 560 may also include one or more user input devices (e.g., a keyboard, a keypad, a mouse, or the like) and user output devices (e.g., a display, a speaker, or the like).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network nodes, BNGs, servers, ANs, CPEs, routers, or other network elements and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network nodes, BNGs, servers, ANs, CPEs, routers, or other network elements, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method for network access by a residential gateway via a network in a control and user plane separation (CUPS) architecture, the method comprising:
   establishing, via an aggregate gateway function, a separate packet forwarding control protocol session for each packet data unit (PDU) session between the residential gateway and the network; and
   facilitating, via the aggregate gateway function, network access by the residential gateway via each PDU session according to a corresponding, separate packet forwarding control protocol session.

2. The method of claim 1, further comprising:
   authenticating, via the aggregate gateway function, the residential gateway to the network in response to a control message from the residential gateway; and wherein
   the establishing establishes a first packet forwarding control protocol session for a first PDU session between the residential gateway and the network, in response to the residential gateway being authenticated to the network.

3. The method of claim 1, wherein
   the aggregate gateway function includes an aggregate gateway function user plane and an aggregate gateway function control plane; and
   the establishing includes exchanging packet forwarding control protocol session establishment messages between the aggregate gateway function user plane and the aggregate gateway function control plane to establish a first packet forwarding control protocol session for a first PDU session between the residential gateway and the network.

4. The method of claim 3, wherein the packet forwarding control protocol session establishment messages include a packet forwarding control protocol session establishment request message and a packet forwarding control protocol session establishment response message.

5. The method of claim 3, further comprising:
   establishing the first PDU session after establishing the first packet forwarding control protocol session; and
   obtaining IP addresses and prefixes from the network for network access by the residential gateway via the first PDU session.

6. The method of claim 1, wherein
   each packet forwarding control protocol session hosts, for a respective PDU session, a first set of forwarding rules for forwarding control messages between a control plane and a separate user plane and a second set of forwarding rules for forwarding data traffic between the control plane and the separate user plane.

7. The method of claim 1, wherein, for at least a first PDU session, the establishing comprises:
   establishing a first packet forwarding control protocol session for hosting a first set of forwarding rules for forwarding control messages between a control plane and a separate user plane; and
   modifying the first packet forwarding control protocol session to add a second set of forwarding rules for forwarding data traffic between the control plane and the separate user plane.

8. The method of claim 1, wherein, for at least a first PDU session, the establishing comprises:
establishing a first packet forwarding control protocol session for hosting a first set of forwarding rules for forwarding control messages between a control plane and a separate user plane, and a second set of forwarding rules for forwarding data traffic between the control plane and the separate user plane.

9. The method of claim 8, wherein, for at least the first PDU session, the method further comprises:
modifying the second set of forwarding rules for forwarding data traffic between the control plane and the separate user plane.

10. A network element to facilitate network access by a residential gateway via a network in a control and user plane separation (CUPS) architecture, the control and user plane separation architecture including an aggregate gateway function having a control plane and a separate user plane, the network element comprising:
at least one processor; and
at least one memory storing instructions that, when executed by the at least one processor, cause the network element to
establish, via the aggregate gateway function, a separate packet forwarding control protocol session for each packet data unit (PDU) session between the residential gateway and the network, and
facilitate, via the aggregate gateway function, network access by the residential gateway via each PDU session according to a corresponding, separate packet forwarding control protocol session.

11. The network element of claim 10, wherein the at least one memory stores instructions that, when executed by the at least one processor, cause the network element to
authenticate, via the aggregate gateway function, the residential gateway to the network in response to a control message from the residential gateway, and
establish a first packet forwarding control protocol session for a first PDU session between the residential gateway and the network, in response to the residential gateway being authenticated to the network.

12. The network element of claim 10, wherein the at least one memory stores instructions that, when executed by the at least one processor, cause the network element to exchange packet forwarding control protocol session establishment messages between the control plane and the separate user plane to establish a first packet forwarding control protocol session for a first PDU session between the residential gateway and the network.

13. The network element of claim 12, wherein the packet forwarding control protocol session establishment messages include a packet forwarding control protocol session establishment request message and a packet forwarding control protocol session establishment response message.

14. The network element of claim 12, wherein the at least one memory stores instructions that, when executed by the at least one processor, cause the network element to establish the first PDU session after establishing the first packet forwarding control protocol session.

15. The network element of claim 14, wherein the at least one memory stores instructions that, when executed by the at least one processor, cause the network element to obtain IP addresses and prefixes from the network for network access by the residential gateway via the first PDU session.

16. The network element of claim 10, wherein each packet forwarding control protocol session hosts, for a respective PDU session, a first set of forwarding rules for forwarding control messages between the control plane and the separate user plane and a second set of forwarding rules for forwarding data traffic between the control plane and the separate user plane.

17. The network element of claim 10, wherein, for at least a first PDU session, the at least one memory stores instructions that, when executed by the at least one processor, cause the network element to
establish a first packet forwarding control protocol session for hosting a first set of forwarding rules for forwarding control messages between the control plane and the separate user plane, and
modify the first packet forwarding control protocol session to add a second set of forwarding rules for forwarding data traffic between the control plane and the separate user plane.

18. The network element of claim 10, wherein, for at least a first PDU session, the at least one memory stores instructions that, when executed by the at least one processor, cause the network element to
establish a first packet forwarding control protocol session for hosting a first set of forwarding rules for forwarding control messages between the control plane and the separate user plane, and a second set of forwarding rules for forwarding data traffic between the control plane and the separate user plane.

19. The network element of claim 18, wherein, for at least the first PDU session, the at least one memory stores instructions that, when executed by the at least one processor, cause the network element to modify the second set of forwarding rules for forwarding data traffic between the control plane and the separate user plane.

20. A non-transitory computer-readable medium including program instructions that, when executed by a network element, cause the network element to perform a method for network access by a residential gateway via a network in a control and user plane separation (CUPS) architecture, the method comprising:
establishing, via an aggregate gateway function, a separate packet forwarding control protocol session for each packet data unit (PDU) session between the residential gateway and the network; and
facilitating, via the aggregate gateway function, network access by the residential gateway via each PDU session according to a corresponding, separate packet forwarding control protocol session.

* * * * *